United States Patent
Srimongkolkul

[11] Patent Number: 5,112,479
[45] Date of Patent: May 12, 1992

[54] OIL PURIFICATION UNIT WITH CYCLONIC RESERVOIR SECTION AND FILTRATION SECTION

[75] Inventor: Vichai Srimongkolkul, Machesney Park, Ill.

[73] Assignee: Micropure Filtration, Inc., Rockford, Ill.

[21] Appl. No.: 530,823

[22] Filed: May 30, 1990

[51] Int. Cl.⁵ ............................................. B01D 36/00
[52] U.S. Cl. .................................... 210/149; 210/182; 210/260; 210/266; 210/290; 210/304; 210/312; 210/352; 210/484; 210/485; 210/512.1; 210/335
[58] Field of Search ............... 210/87, 171, 184, 260, 210/265, 290, 304, 350-352, 149, 182, 266, 283, 284, 282, 335, 312, 484, 485, 512.1

[56] References Cited

U.S. PATENT DOCUMENTS

| | | | |
|---|---|---|---|
| 347,403 | 8/1886 | Weiderman | 210/265 |
| 1,682,757 | 9/1928 | Hopkins | 210/304 |
| 1,730,581 | 10/1929 | McMachen et al. | 210/284 |
| 1,838,263 | 12/1931 | Kelley | 210/265 |
| 1,898,168 | 2/1933 | Belden | 208/182 |
| 2,027,876 | 1/1936 | Pennebaker | 210/182 |
| 2,278,488 | 4/1942 | Ralston | 210/290 |
| 2,280,577 | 4/1942 | Guggolz | 210/184 |
| 2,517,051 | 8/1950 | Swenson | 210/87 |
| 2,738,877 | 3/1956 | Beach | 210/182 |
| 2,896,645 | 7/1959 | Iwaski | 134/111 |
| 3,122,430 | 2/1964 | Seidel et al. | 55/278 |
| 3,202,286 | 8/1965 | Smit | 210/286 |
| 3,342,340 | 9/1967 | Shindell | 210/283 |
| 3,904,512 | 9/1975 | Clark | 208/182 |
| 3,954,622 | 5/1976 | Reedy | 210/71 |
| 3,972,816 | 8/1976 | Mail et al. | 210/259 |
| 4,197,205 | 4/1980 | Hirs | 210/275 |
| 4,447,322 | 5/1984 | Zajdlik | 210/304 |
| 4,498,992 | 2/1985 | Garrett, Jr. | 210/664 |
| 4,655,939 | 4/1987 | Moser | 210/799 |
| 4,772,402 | 9/1988 | Love | 210/265 |

Primary Examiner—Robert A. Dawson
Assistant Examiner—Joseph Drodge
Attorney, Agent, or Firm—Leydig, Voit & Mayer

[57] ABSTRACT

A mobile purification apparatus for purifying oil contaminated with grit, metal particles, water and the like. The apparatus includes a strainer with a filter cartridge for removal of large contaminant particle and a filter apparatus. The filter apparatus including a heater and an upper filter element section with a plurality of filter media layers therein. The filter media layers are supported by a screen and compressed by a biasing spring. A lever is provided for off-loading compression on the filter media layers so a top of the filter apparatus can be removed to allow for cleaning and replacement of the filter media layers.

9 Claims, 3 Drawing Sheets

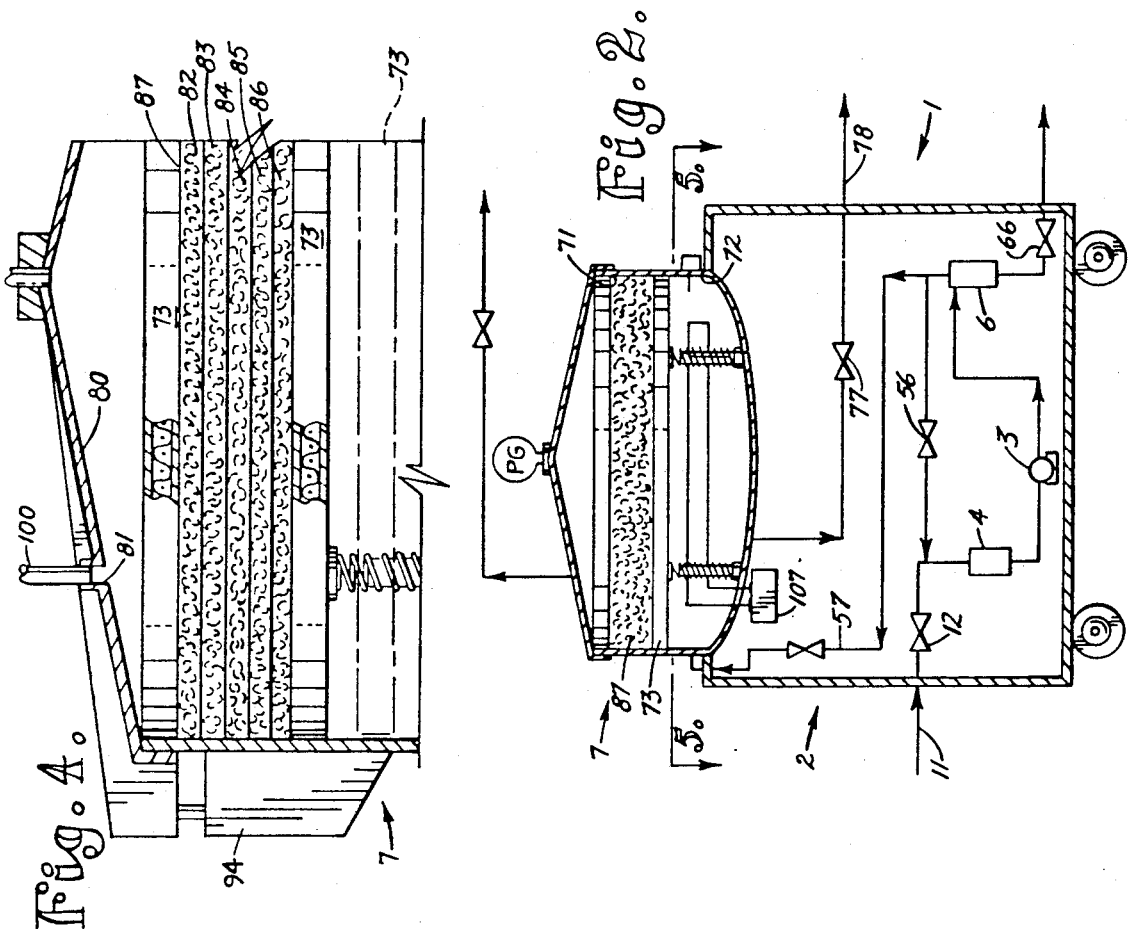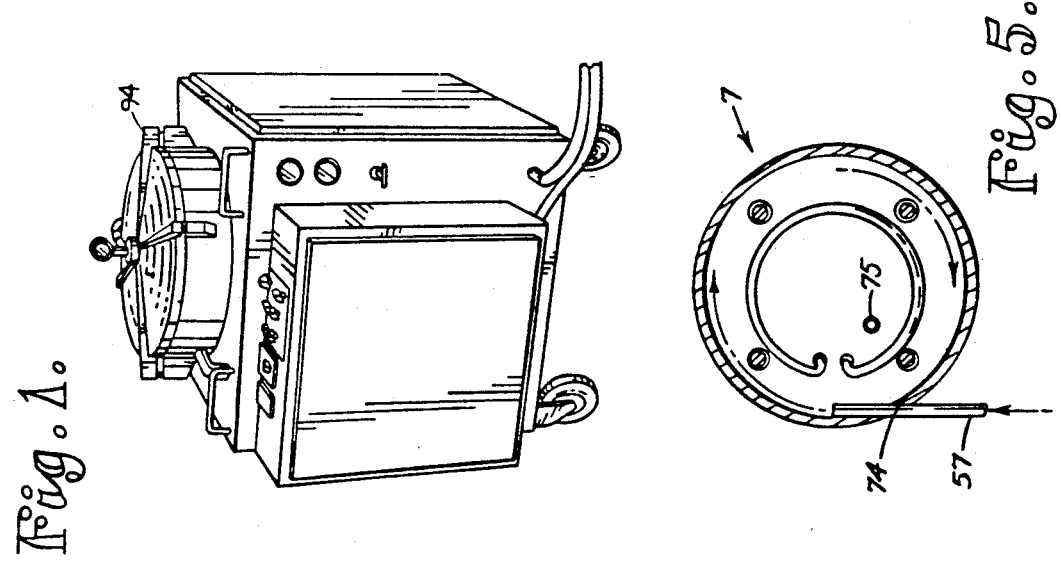

OIL PURIFICATION UNIT WITH CYCLONIC RESERVOIR SECTION AND FILTRATION SECTION

BACKGROUND OF THE INVENTION

This invention relates generally to an improved apparatus and method for purifying contaminated industrial oil and, more particularly, such apparatus and method which are easily adapted to an individual user's purification requirements.

Oil is used extensively as a lubricant to protect the moving parts of machinery from the effects of friction. As oil is used, a variety of contaminants act to undermine the oil's protection capabilities. These impurities include: acidic compounds, oxidation by-products, metallic soaps, colloidal carbons and water. Removal of these impurities improves the lubricating performance and non-corrosive characteristics of the oil, thereby reducing equipment wear and replacement costs. Once purified, the life of the oil can be extended indefinitely.

There are numerous conventional methods for the purification of contaminated lubrication oil as well as the equipment developed to practice this method. Various cleansing techniques, including filtration, adsorption, coagulation and centrifuging, have been used separately and in combination.

In general, different methods of passing a contaminated fluid through porous media to effect mechanical filtration have also been conventionally used. Several references incorporate passing contaminated fluids through layers of particulate filter media to trap impurities. Typical references to this method are U.S. Pat. No. 4,197,205 of Hirs; U.S. Pat. No. 1,838,263 of Helley and U.S. Pat. No. 3,202,286 of Smit. Each of these patents proposes layering the filter media so that the size of the particles decreases in the direction of flow in order to trap increasingly smaller impurities.

Centrifugation, like filtration, is a physical operation sometimes used in fluid purification. Both U.S. Pat. No. 3,954,611 by Reedy and U.S. Pat. No. 4,498,992 by Garrett use centrifuges to remove solids, sludges and water from contaminated oil.

The above-noted Garrett patent also proposes contacting contaminated oil with impurity adsorbent material to remove contaminants from the oil and, in particular, using a singular adsorbent (Fuller's earth) in the purification process. The use of an individual adsorbent in a purification process has had limited success since a single adsorbent limits the adsorption of impurties to those contaminants which readily adhere to that particular adsorbent's surface. In addition, contaminated oil most often contains a number of impurities that need to be removed and that are not adapted to be removed by a single adsorbent. In addition, in the presence of several contaminants which are individually attracted to an adsorbent, a particular impurity may be more readily adsorbed to the exclusion of others. Therefore, in a mono-adsorbent system, preferential adsorption allows some impurities to avoid removal.

Regardless of what purification techniques are used, present oil purification systems are not readily adaptable to a particular user's needs. The contamination profile (type and concentration of impurities present) of lubrication oil is dependent upon the equipment and operating conditions of the system it protects. This profile not only changes from system to system, but may vary within a particular system as operating conditions fluctuate. The existing purification processes are unable to adapt to these variations. Therefore, these processes cannot ensure a user's purification requirement is achieved independent of the system, nor can they ensure a protection as the system's contamination profile changes.

SUMMARY OF THE INVENTION

An improved apparatus and method are provided for the purification of lubrication oil that are adaptable to ensure removal of system or time dependent contaminants.

The apparatus generally comprises a strainer, a filtration unit and a pump to circulate oil through the apparatus. The strainer is downstream of and in flow communication with a contaminated oil source. The pump, located downstream of and in flow communication with the strainer, pulls contaminated oil from the source and through the strainer to remove impurities of relatively large size that could damage downstream equipment. Where the oil contains a relatively large quantity of water, the oil may be conveyed to a cyclone centrifuge downstream of and in flow comminication with the pump. The strained oil is introduced into the cyclone centrifuge which uses centrifugal force to separate water and other heavy contaminants from the oil.

The adaptability of the apparatus is especially found in the filtration unit which is downstream of and in flow communication with the strainer. The oil from the strainer enters a lower section of the filtration unit that functions as a holding reservoir, removing impurities from the oil using cyclonic movement. The oil then flows into the upper section of the filtration unit which contains one or more layers of particulate filter media wherein the media has voids between the particles of each layer defining passageways of a minimum mean diameter. The passageways allow oil to pass through but trap impurities having larger diameters. In addition, the filter media layers may include one or more adsorbent materials that can adsorb various adsorbent impurities as when contacted by the contaminated oil. The layers of filter media are installed in the filtration unit so that the diameter of filter particles decreases with each successive layer in the direction of flow to trap increasingly smaller contaminants. Also, the layer installation sequence reflects the adsorption characteristic of each layer so as to maximize the effectiveness of this purification technique. The flow rate of purified oil exiting the filtration unit is controlled by adjusting the oil viscosity using an oil temperature control device.

The filtration and adsorption capabilities of the invention can be altered to adapt to a specific application by exchanging layers of filter media and increasing or decreasing both particulate grade and layer thickness and by variation of the type of particulate material utilized. To optimize the performance of the filtration media, a lab scale simulation of the purification process is conducted on a sample of the contaminated oil using assorted layers of filtration media of different particulate materials and layer thicknesses. This simulation ensures a user's purification requirements are achieved by the invention.

The apparatus can be used as a continuous oil-cleaning system for a single piece of equipment or be made mobile so that it can be moved to sites where its service is needed.

The method of the present invention utilizes the apparatus described above to remove contaminants from oil and specifically includes the selecting of multiple filtration and adsorbent materials to optimize the purification of the oil.

OBJECTS OF THE INVENTION

The principal objects of the invention are: to provide an apparatus and method for the purification of contaminated lubrication oil using filtration, adsorption and centrifuging techniques; to provide such an apparatus which incorporates layers of particulate filter media which filter and adsorb impurities from the contaminated oil; to provide such an apparatus which is adaptable to a particular user's purification requirement through altering the filtration and adsorption characteristics of the filter media layers by exchanging layers and increasing or decreasing different particulate materials and layer thicknesses; to provide such an apparatus which uses a cyclonic force to separate heavier contaminants from the oil so as to substantially limit the number of movable parts in the apparatus; to provide such an apparatus which is mobile; to provide a method for determining the optimum filtration media that ensures the user's purification requirement is achieved; and to provide such a lubrication oil purification apparatus and method that are economical to manufacture and practice, convenient and safe to use and which are particularly well adapted for their intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and feature thereof.

BRIEF DESCRIPTION OF THE DRAWINGS

FIG. 1 is a perspective view of a mobile oil purification apparatus according to the present invention.

FIG. 2 is an enlarged, partially schematic and cross-sectional view of the oil purification apparatus showing fluid flow piping, a cyclonic force, a filtration unit and a pump.

FIG. 4 is an enlarged and fragmentary view of the filtration unit of the oil purification apparatus.

FIG. 5 is an enlarged and fragmentary cross-sectional view of the filtration unit of the oil purification apparatus, taken along line 5—5 of FIG. 2.

DETAILED DESCRIPTION OF THE INVENTION

Figure 3:
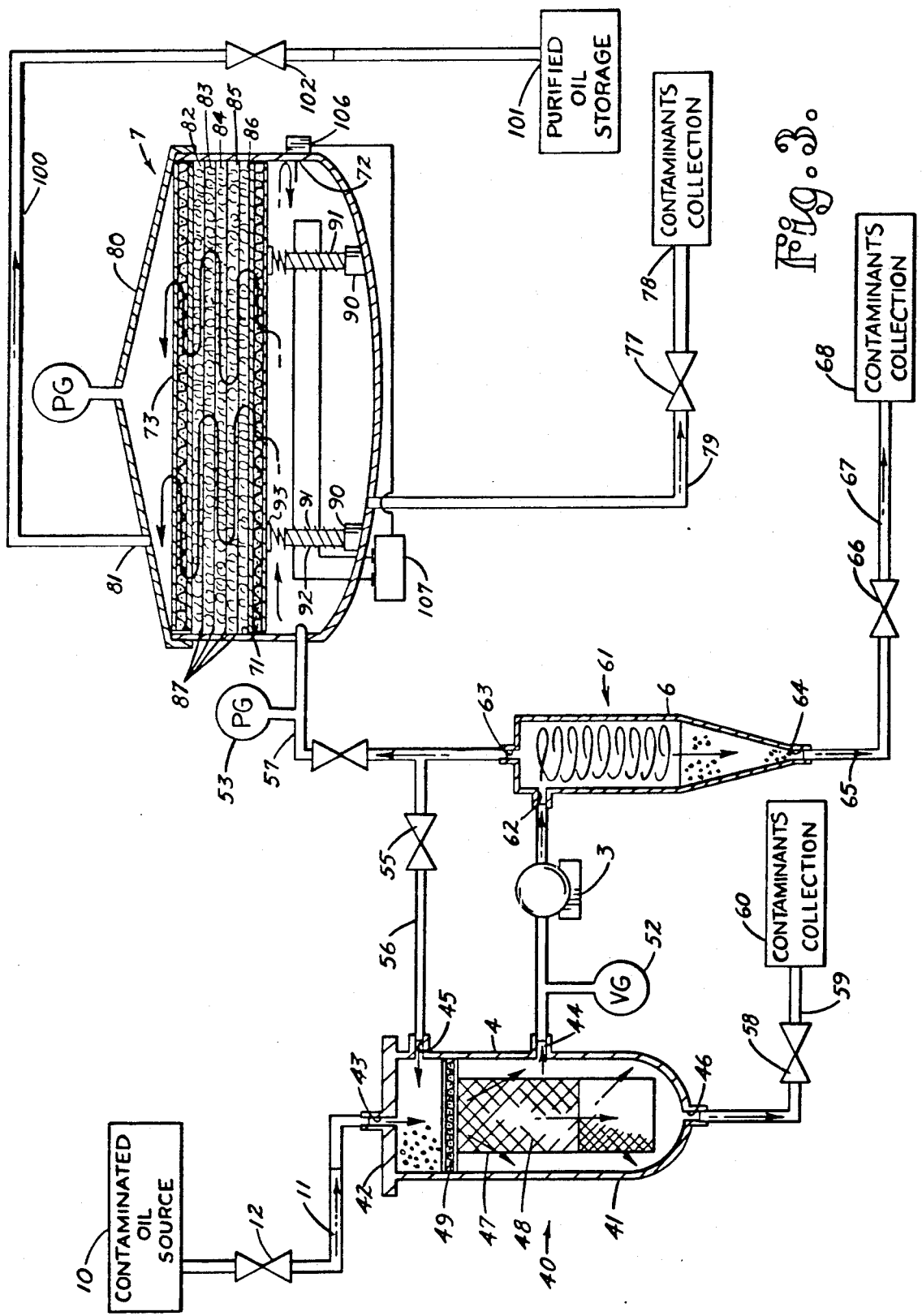
FIG. 3 is an enlarged, partially schematic and cross-sectional view of the oil purification apparatus.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed embodiment.

Certain terminology will be used in the following description for convenience and reference only and is not intended to be limiting. The terms "inwardly" and "outwardly" will refer to directions toward and away from, respectively, the geometric center of the structure being referenced. "Upstream" and "downstream" relate to the product flow path.

In the drawings, the reference numeral 1 generally refers to an oil purification apparatus in accordance with the present invention. The reference numeral 2 refers to a mobile cabinet generally containing a portion of the apparatus 1.

Referring to FIGS. 2 and 3 in greater detail, the apparatus 1 generally comprises a pump 3, a strainer 4, a cyclone centrifuge 6 and a filtration unit 7. The pump 3 provides a pressure differential for drawing contaminated oil into the strainer 4 and conveying such oil through the apparatus 1. The strainer 4 is located upstream of and in flow communication through the pump 3 with the filtration unit 7. The centrifuge 6 is preferably positioned between the filtration unit 7 and the strainer 4 when relatively large amounts of water are found in the oil; otherwise, the centrifuge 6 may be eliminated from the apparatus 1.

Contaminated oil is pulled from a contaminated oil source, generally represented by the box 10, through a suction line 11 and into the strainer 4. The contaminated oil source 10 can be either a piece of equipment utilizing the oil, in which case the oil may be pumped directly from the location of use, or a contaminated oil reservoir. Flow into the strainer 4 is controlled by a suction valve 12.

The strainer 4 (see FIG. 3) generally comprises a containment vessel 41 having a sealable but removable lid 42 with an oil inlet port 43, an oil outlet port 44, a bypass port 45 and a drain port 46. A filter sock 47, wire basket 48 and a ring 49 are located inside the containment vessel 41. The filter sock 47 is both supported by and lines the inside of the wire basket 48. Both the filter sock 47 and wire basket 48 are secured to the ring 49 with their openings substantially aligned with a central opening in the ring 49. The ring 49 in turn is secured to the containment vessel 41 with its outer surface flush with the inside surface of the containment vessel 41.

Contaminated oil enters the strainer 4 through the oil inlet port 43 and flows into and through the ring 49, filter sock 47 and wire basket 48, as indicated by the arrows labeled 50. The mesh of the filter sock 47 is sized to remove from the oil relatively large pieces of grit, metal or the like which could damage downstream process equipment or that would rapidly plug the filtration unit 7. The oil and any remaining impurities pass through the filter sock 47 and exit the strainer 4 through the oil outlet port 44.

Aside from being a filtration device, the strainer 4 serves as a break tank and contaminated oil reservoir for fluid transfer through the apparatus 1. Once the pump 3 has begun operating and the desired initial pressure differential (ten pounds per square inch) is registered between a vacuum gauge 52 located upstream of the pump 3 and a pressure gauge 53 located downstream of the pump 3, an automatic bypass valve 55 is opened and controlled by inputs from the gauges 52 and 53. This diverts oil back to the strainer 4 via a bypass line 56. Bypassed oil enters the strainer 4 through the bypass port 45 on the upstream side of the ring 49. By automatically or manually adjusting the amount of flow through the bypass valve 55, the desired pressure differential can be maintained.

The strainer 4 can be drained for cleaning or the like through a strainer drain valve 58 to allow the oil to exit the oil outlet port 44 and pass through a strainer drain line 59 to storage generally represented by the box 60.

Oil from the strainer 4 flows through the pump 3 to the cyclone centrifuge 6. The cyclone centrifuge 6 has a substantially conically-shaped inner chamber 61 with the vertex thereof at the lower end. The chamber 61 has an oil inlet port 62, oil outlet port 63 and drain port 64. The oil inlet port 62 is aligned tangentially relative to the inner surface of the upper portions of the conical chamber 61. This alignment creates a generally cyclonic flow of oil within the cyclone centrifuge 6 when oil is introduced through the oil inlet port 62. Relatively heavy contaminants, especially water, are induced to separate from the oil by centrifugal action which throws these contaminants radially outward against the inner surface of the conical chamber 61. Gravity then pulls these contaminants to the bottom of the cyclone centrifuge 6, as shown by the arrow labeled 65. The oil and any remaining, relatively light impurities flow upwardly and exit the cyclone centrifuge 6 through the oil outlet port 63. The waste material at the bottom of the cyclone centrifuge 6 is removed from the apparatus 1 by a continuous or selective flow through a centrifuge drain valve 66 to allow contaminant-enriched oil to flow through the drain port 64 and exit a centrifuge drain line 67 to waste storage, generally represented by the box 68.

The oil from the cyclone centrifuge 6 not diverted by the bypass valve 55 back to the strainer 4 flow enters the filtration unit 7. The body of the filtration unit 7 is substantially cylindrical and divided into two sections: a reservoir or cyclone section 72 and a filter element section 71. These two sections are divided by a wire mesh screen 73.

The cyclone section 72 is a generally cylindrical, bottom-enclosed, but top-open, chamber having an oil inlet port 74 and drain port 75. Oil enters the cyclone section 72 tangentially at the outer wall, as is shown in FIG. 5. The cyclone section 72 serves as a liquid centrifuge to further remove water and heavy contaminants. In particular, oil is introduced into the filtration unit 7 through the oil inlet port 74 aligned tangent to the wall of the cyclone section 72. The impurities which are induced to separate from the oil by centrifugal force are drawn by gravity to the bottom of the filtration unit 7, as shown by the arrows labeled 79. These impurities can be removed from the apparatus 1 through the drain port 75 by a continuous controller (not shown) or, alternatively, by selective manual operation of a filtration unit drain valve 77 so as to allow the impurity-enriched oil to flow through a filtration unit drain line and storage container generally represented by the box 78.

The oil and lighter impurities from the cyclone section 72 flow through the screen 73 and enter the filter element section 71, as shown by the arrows labeled 79. Referring to FIG. 4, the filter element section 71 generally is a cylindrical, bottom-open chamber having a removable lid 80 with a purified oil discharge port 81 located therein. The filter element section 71 contains one or more particulate filter media layers 82, 83, 84, 85 and 86 in a stacked relationship that extend entirely across the filter element section 71 so as to snugly engage the outer wall thereof and are supported by the screen 73. Each of the filter media layers 82-86 is contained in and kept from mixing with adjacent layers by a non-woven polyester bag 87. Materials which can be used as filter media layers include, but are not limited to: diatamaceous earth, clay, cellulose, activated charcoal and silica. The filter media layers 82-86 are accessible by removing the lid 80.

The particles in the filter media layers 82-86 are in close abutting relationship relative to one another so that voids between particles create a system of passageways having a substantially constant effective filtering diameter in each of the filter media layers 82-86. The passageways allow oil to pass through while trapping those contaminants which are larger in diameter. When multiple filter media layers 82-86 are used, the size of the filter particles decreases in the direction of flow from the bottom layer 82 to the top layer 86. This decreases the diameter of the passageways in each of the successive filter media layers 83-86, allowing for the filtration of increasingly smaller impurities.

Certain of the filter media layers 82-86 preferably also include materials which adsorb impurities when in contact with contaminated oil. The adsorption capability of each layer 82-86 is dependent upon the material(s) selected for the layer. For each contaminated oil to be purified by the apparatus 1, the layers 82-86 are modified to selectively remove the particular impurities encountered. For certain oils, samples may have to be tested to find the appropriate mix of materials for the layers 82-86. The installation sequence of the filter media layers 82-86 reflects their individual adsorption characteristics to ensure maximum adsorption of impurities. For example, filter media layer 83, which preferentially adsorbs a first contaminant over a second contaminant, will be preceded by filter media layer 82, which adsorbs the first contaminant to allow adsorption of the second contaminant by the subsequent filter media layer 83.

As oil flows through the filter media layers 82-86, the impurities filtered or adsorbed will eventually partially block the layers 82-86 and create a pressure drop across the filtration unit 7. This process causes the pressure drop across the pump 3 to steadily increase. This increase can be alleviated by increasing the bypass flow using the bypass valve 55. Eventually, this will reduce the flow rate of purified oil to an unacceptable level. Once the pressure drop across the pump 3 has reached twenty-three pounds per square inch, the filtration unit 7 will no longer perform optimally. At this point, if the bypass flow cannot be increased, the filter media layers 82-86 should be cleaned or replaced.

Referring again to FIGS. 1 and 3, the apparatus 1 also includes means for compressing the filter media layers 82-86 between the screen 73 and the filtration unit lid 80 by biasing upward the position of the screen 73 inside the filtration unit 7. This biasing is necessary to prevent cracking or channelling within the filter media layers 82-86 which tend to fluidize the filter particles and allow contaminants to bypass filtration and adsorption.

The biasing means generally includes a set of four cylindrical spring posts 90 attached to and adapted to reciprocate relative to the bottom of the filtration unit 7. Each spring post 90 includes a compression spring 91 axially mounted upon a somewhat shorter support shaft 92 and a cap 93 located between each respective spring 91 and the screen 73, such that the screen 73 is supported by and biased upwardly by the spring posts 90. As the top 80 is installed on the filtration unit 7, pressure is applied to the top 80 to compress the springs 91 and allow the top 80 to be seated on the remainder of the filtration unit and secured in place by equally-spaced, circumferentially-positioned clamps 94. The springs 91 prevent the screen 73 from contacting the bottom of the filtration unit and assist in biasing the filter media layers 82-86 against one another.

Purified oil leaves the top layer of filter media layer 86 and exits the filtration unit 7 through the purified oil discharge port 81 in the top 80. The purified oil then flows through a purified oil discharge line 100 to the desired purified oil discharge point, generally represented by the box 101. The purified oil discharge point may be either a piece of equipment utilizing the oil or a purified oil reservoir. Flow through the purified oil discharge line 100 is selectively controlled by a discharge valve 102.

The flow rate of purified oil leaving the apparatus 1 can be partially controlled by adjusting the temperature of the oil. Flow rate is generally inversely proportional to oil viscosity which is inversely proportional to oil temperature. Therefore, as the temperature of the oil is increased, flow rate through the apparatus 1 increases. Heat is supplied to the oil by an immersion coil heater 105 located in the cyclone section 72 of the filtration unit 7. The optimum temperature range for oil in the filtration unit 7 is 100° F. to 140° F. This range is monitored and maintained automatically by use of a thermocouple 106 and a thermostat 107.

In use, used lubrication oil from different sources have different contamination profiles which are dependent upon the equipment and operating conditions of the system the oil protects. The apparatus 1 of the present invention is intended for use in an oil reclamation process which adapts to a particular oil's contamination profile to ensure that desired purification is achieved.

The process is initiated by analyzing a representative sample of the contaminated oil to determine the impurities undermining the oil's protection capabilites. A lab scale simulation of the apparatus 1, according to the present invention, is used to determine the optimum filter media layers and material of construction, such as layers 82-86, to be used to purify the oil. The simulation is conducted on a sample of contaminated oil using assorted filtering materials as layers 82-86. By adjusting layer thickness, varying particulate material and installation sequence, the appropriate filter media layers 82-86 for the application will be selected. This simulation ensures that the user's purification requirement is achieved.

Figure 6:
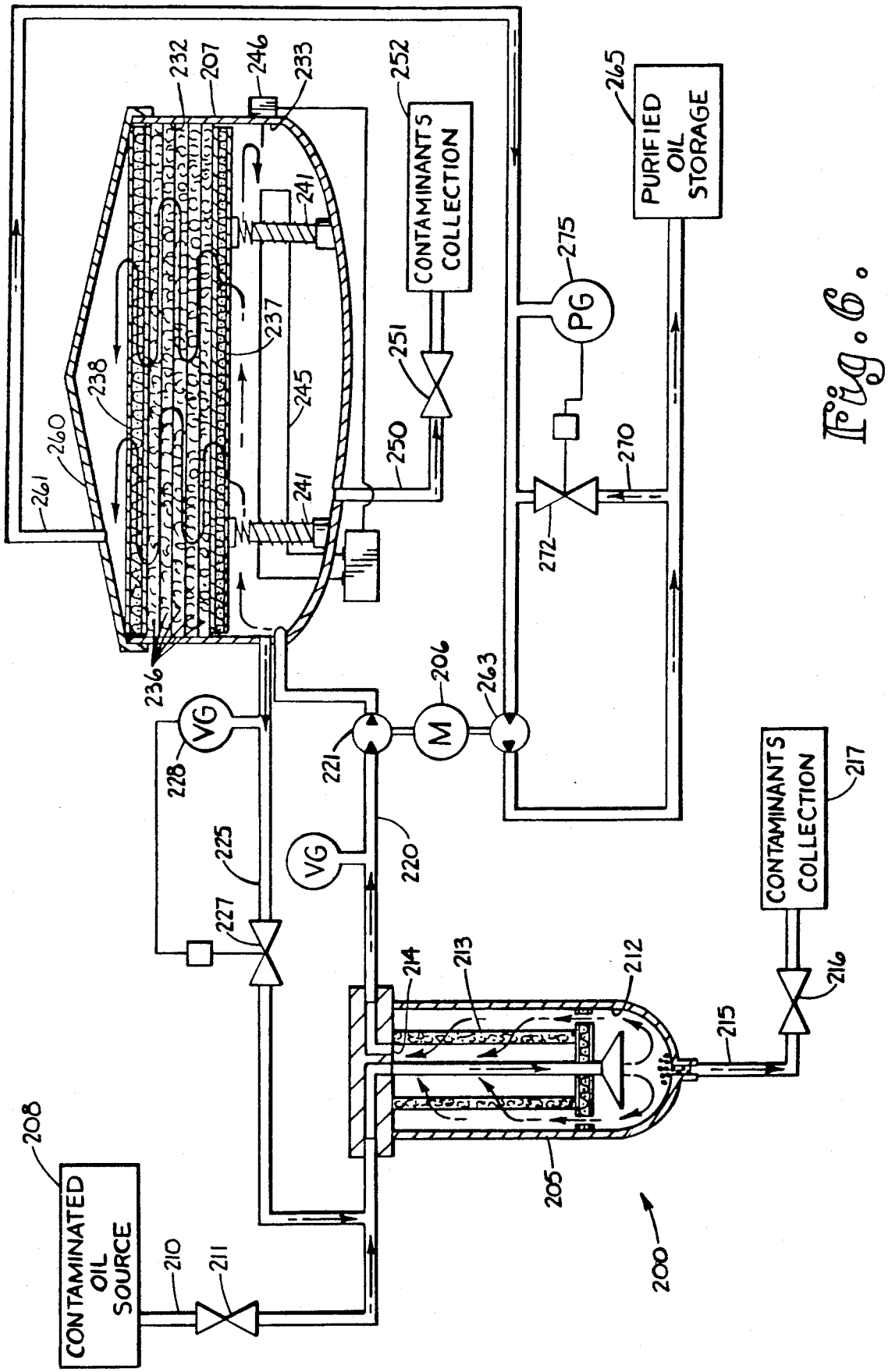
FIG. 6 is a partially schematic and cross-sectional view of a modified oil purification apparatus in accordance with the present invention.

FIG. 6 illustrates a modified oil purification apparatus in accordance with the present invention, generally identified by the reference numeral 200. The modified oil purification apparatus 200 includes a contaminant removal unit or gross strainer 205, a pump unit 206 and a filtration unit 207. The apparatus 200 is similar to the apparatus 1 of the previous invention in certain ways and these similarities will not be discussed herein in great detail. Consequently, reference is made to the first embodiment to provide additional detail relative to the present embodiment.

Contaminated oil from a source generally indicated by the reference numeral 208 is flow connected to the apparatus 200 by a conduit 210 through a flow control valve 211. The oil flows through the conduit 210 to the gross strainer 205. Preferably, the gross strainer 205 is of a type that both separates entrained particles, such as metal, and water from the oil as the oil flows through a lower reservoir 212 due to a decrease in flow velocity of the oil therein and due to gravity. The gross strainer 205 also includes a filtration cartridge 213 for removing relatively large contaminants from the oil. The gross strainer 205 is designed such that oil flows first through the lower chamber 212, then upwardly through the filter cartridge 213, and exits through an outlet 214 that receives flow from a radial interior of the filter cartridge 213. Contaminants that settle to the bottom of the reservoir 212 are discharged from the gross strainer 205, through a conduit 215 under control of flow control valve 216, and into a contaminants' collection container generally indicated by the reference numeral 217. A gross strainer of this type is available from Dahl Products of Kearney, Nebr.

Oil flow exits the strainer 205 through a conduit 220 which flow communicates with one pumping head 221 of the pump unit 206, whereby the oil is pressurized prior to entering the filtration unit 207. The conduit 220 also flow communicates with the filtration unit 207 so as to tangentially inject the oil pumped by the pump head 221 into a lower portion of the filtration unit 207.

A bypass conduit 225 also flow communicates with a lower portion of the filtration unit and with the conduit 210 upstream of the strainer 205. A pressure flow control adjustment valve 227 controls the pressure requirement for filtration by opening and bypassing oil through the conduit 225 when pressure within the lower portion of the filtration unit 206 exceeds a preselected value, the pressure being indicated by a pressure gauge 228.

The filtration unit 207 is quite similar to the filtration unit 7 of the previous embodiment including a filter chamber or upper portion 232 and a lower reservoir portion 233. The upper portion 232 has positioned therein a plurality of particulate media layers 236 located between screens 237-238 and generally completely filling the radial cross-section of the filtration unit upper portion 232 so that the oil passing through the filtration unit 207 must pass through the media layers 236. The filtration unit reservoir portion 233 includes a plurality of compression units 241 for operatively biasing the screens 237 and 238 toward each other and thereby compressing the filtration media layers 236 therebetween. The filtration unit reservoir portion 233 also includes a heating element 245 for heating the oil therein at a selected temperature as controlled by a temperature controller 246.

Oil enters the filtration unit reservoir portion 233 on a tangential entry so as to circulate about the reservoir portion 233 so as to urge water and other heavy contaminants downwardly toward the bottom of the reservoir portion 233. The water and contaminants are collected in a discharge conduit 250 controlled by a valve 251 and discharged into a collection container, as indicated by the reference numeral 252.

Oil that has passed through the filtration unit 207 discharges through a top or lid 260 and a discharge conduit 261. The discharge conduit 261 flow connects with a second head 263 of the pump unit 206 that pressurizes and urges the oil through the discharge conduit 261 to a purified oil storage container, as indicated by the reference numeral 265. A vacuum bypass conduit 270 flow connects between the upstream and downstream sides of the conduit 261 with respect to the pump head 263 and flow therethrough is controlled by a valve 272. The valve 272 allows oil to bypass around the pump head 263 to prevent too much of a vacuum being drawn on the filtration unit 207 and the vacuum pressure is maintained under a selected vacuum/pressure as controlled by a vacuum/pressure controller 275.

It is to be understood that while certain forms of the present invention have been illustrated and described herein, it is not to be limited to the specific forms or arrangement of parts described and shown.

What is claimed and desired to be secured by Letters Patent is as follows:

1. A filtration apparatus for removing impurities from contaminated liquid comprising a filtration unit; said filtration unit having:
   (a) a reservoir section having a generally hollow circular cross-section and having a bottom, tangential means for introducing contaminated liquid into said reservoir section so as to operably produce cyclonic flow within said section to thereby induce removal of relatively heavy impurities from said contaminated liquid using centrifugal force and to create a flow of partially cleaned liquid;
   (b) a contaminant discharge port near the bottom of said reservoir section;
   (c) a filter element section; at least one layer of particulate filter media extending across said filter element section for removing impurities from the partially cleaned liquid as such liquid passes through said filter media;
   (d) a purified liquid discharge port in said filter element section positioned downstream from said filter media layer;
   (e) a screen extending across said filtration unit for providing a support surface for said filter media layer said screen separating said reservoir and filter sections; and
   (f) resiliently yieldable spring means acting against said screen for selectively compressing said filter media layer during operation of said unit.

2. The apparatus as described in claim 1 wherein:
   (a) said means for introducing liquid into said reservoir section includes a liquid injection port extending tangentially into said reservoir section.

3. The apparatus as described in claim 1 including:
   (a) means for off-loading said spring means so as to allow said filter media layer to be removed from said apparatus.

4. The filtration apparatus as described in claim 1 wherein:
   (a) said spring means comprises a compression spring sleeved on a shaft and operably biasing against said screen and said bottom of said reservoir section.

5. The apparatus as described in claim 1 further including:
   (a) a pre-treatment strainer located upstream of and in flow communication with said filtration unit for operably removing relatively large particles from the contaminated liquid.

6. The apparatus as described in claim 5 wherein said strainer comprises:
   (a) a filter sock for trapping impurities as the contaminated liquid flows from one side to an opposite side of said sock;
   (b) a wire basket for supporting said filter sock;
   (c) a container having a liquid inlet and a liquid outlet port for enclosing said sock and said basket; and
   (d) means for securing said sock and basket to said container so that contaminated liquid enters through said inlet port, flows through said sock and basket and exits said strainer through said outlet port.

7. The apparatus as described in claim 5 further including:
   (a) a pre-treatment liquid cyclone flow located downstream of said strainer and upstream of said filtration unit for removing heavy particles from the contaminated liquid using centrifugal force.

8. A filtration apparatus for removing impurities from contaminated liquid comprising a filtration unit; said filtration unit having:
   (a) a reservoir section having a generally hollow circular cross-section and having a bottom, tangential means for introducing contaminated liquid into said reservoir section so as to operably produce cyclonic flow within said section to thereby induce removal of relatively heavy impurities from said contaminated liquid using centrifugal force and to create a flow of partially cleaned liquid;
   (b) a contaminant discharge port near the bottom of said reservoir section;
   (c) a filter element section; a plurality of layers of particulate filter media extending across said filter element section and arranged for upstream to downstream flow for removing impurities from the partially cleaned liquid as such liquid passes through said filter media;
   (d) a purified liquid discharge port in said filter element section positioned downstream from said filter media layer;
   and wherein:
   (e) each of said filter media layers is arranged such that progressively downstream layers provide increasingly smaller flow paths for partially cleaned liquid flowing therethrough, each of said filter media layers being individually contained in cloth bags.

9. A filtration apparatus for removing impurities from contaminated liquid comprising a filtration unit; said filtration unit having:
   (a) a reservoir section having a generally hollow circular cross-section and having a bottom, tangential means for introducing contaminated liquid into said reservoir section so as to operably produce cyclonic flow within said section to thereby induce removal of relatively heavy impurities from said contaminated liquid using centrifugal force and to create a flow of partially cleaned liquid;
   (b) a contaminant discharge port near the bottom of said reservoir section;
   (c) a filter element section; at least one layer of particulate filter media extending across said filter element section for removing impurities from the partially cleaned liquid as such liquid passes through said filter media;
   (d) a purified liquid discharge port in said filter element section positioned downstream from said filter media layer;
   (e) a heater element in said reservoir section; and
   (f) a temperature control mechanism operably coupled to said heater element for controlling the temperature of said heater element and enabling control of the flow rate of contaminated liquid through said unit.

* * * * *